United States Patent [19]

Ardueser et al.

[11] Patent Number: 5,137,196
[45] Date of Patent: Aug. 11, 1992

[54] MANNER OF ROTATABLY MOUNTING A BALE WRAPPING MATERIAL SPREADER ROLL TO SUPPORT WALLS

[75] Inventors: William A. Ardueser; Henry D. Anstey, both of Ottumwa, Iowa

[73] Assignee: Deere & Company, Moline, Ill.

[21] Appl. No.: 370,536

[22] Filed: Jun. 23, 1989

[51] Int. Cl.$^5$ .................... B65H 23/00; F16C 13/00; F16C 35/00
[52] U.S. Cl. ........................... 226/194; 384/419; 384/542; 384/546; 384/587; 226/190
[58] Field of Search .............. 384/416, 418, 419, 428, 384/438, 542, 543, 546, 587; 226/194, 190; 29/116.1, 116.2

[56] References Cited

U.S. PATENT DOCUMENTS

| | | | |
|---|---|---|---|
| 1,784,848 | 11/1927 | Reichle | 384/419 |
| 2,158,865 | 5/1939 | Sammon | 29/116.1 X |
| 2,889,696 | 6/1959 | Lynch | 29/116.1 X |
| 3,443,783 | 5/1969 | Fisher | 248/250 X |
| 3,552,101 | 1/1971 | Papp | 242/68.1 X |
| 3,870,212 | 3/1975 | Polk | 242/55.2 X |
| 4,367,905 | 1/1983 | Nauta | 384/543 X |
| 4,691,503 | 9/1987 | Frerich | 242/55.53 X |
| 4,729,213 | 3/1988 | Raes | 226/190 X |
| 4,852,230 | 8/1989 | Yu | 29/116.1 X |

Primary Examiner—Daniel P. Stodola
Assistant Examiner—P. Bowen

[57] ABSTRACT

A wrap material spreader roll includes a smooth, cylindrical tube having spiral flights at opposite end portions thereof formed from spirally wound wires of circular cross-section, the wires having respective inner ends defined by a radially inwardly projecting portion which is received in a respective hole provided in the tube. The spreader roll is mounted to opposite support walls by respective bolts having hexagonal heads received in hexagonal bores provided in the inner races of a pair of roller bearings that are pressed into the opposite ends of the tube, the bolts having respective threaded stems received in keyhole-shaped holes provided in the walls and having nuts received thereon.

10 Claims, 1 Drawing Sheet

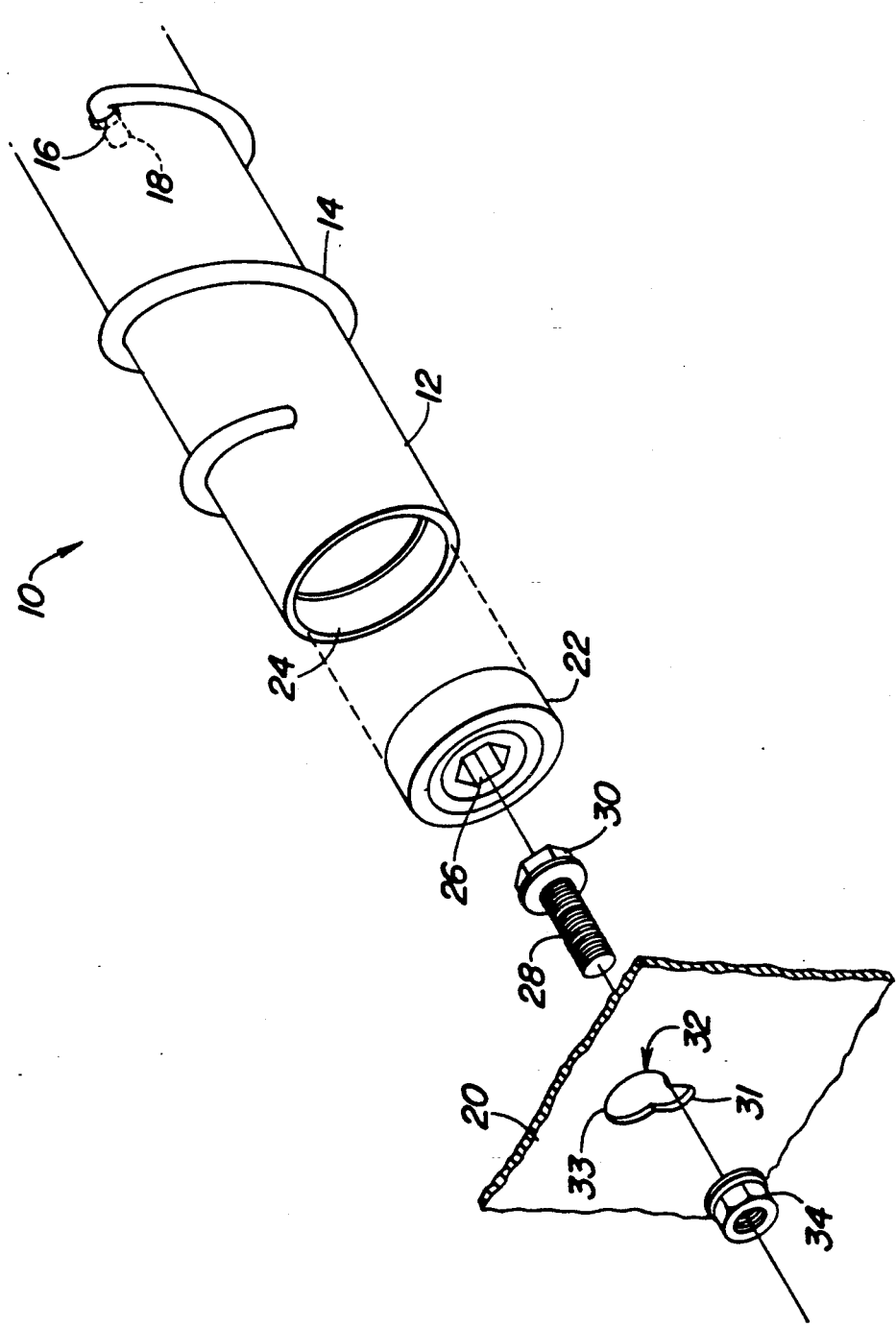

MANNER OF ROTATABLY MOUNTING A BALE WRAPPING MATERIAL SPREADER ROLL TO SUPPORT WALLS

BACKGROUND OF THE INVENTION

The present invention relates to a spreader roll incorporated in a mechanism for feeding wrap material, such as plastic sheeting or net, for enveloping large round bales, formed in a bale-forming chamber and more particularly relates to the mode of rotatably mounting such a roll to support walls at opposite ends thereof.

Conventionally, spreader rolls are constructed of a smooth cylindrical tube having spiral flighting, of opposite hand, located on opposite end portions of the tube. These rolls extend between and are rotatably supported by a pair of support walls by structure including a shaft of hexagonal cross-section extending through the center of the tube and through hexagonal openings provided in the inner race of roller bearings pressed into opposite ends of the tube, the shaft being held in place by bolts extending through the walls and screwed into threaded openings provided in the opposite ends of the shaft. While this mode of mounting the spreader rolls is effective, the support shaft represents a relatively expensive part of the spreader roll assembly and the mounting of the roll is difficult for one person to achieve without using a hoist since the roll has to be held in alignment with the holes in both walls while the bolts are inserted.

SUMMARY OF THE INVENTION

According to the present invention there is provided an improved spreader roll assembly and more particularly there is provided an improved way of rotatably mounting a cylindrical tubular spreader roll to supports located at opposite ends thereof.

An object of the invention is to provide a cylindrical tubular spreader roll which is simply and inexpensively mounted to a support structure in a manner permitting free rotation of the roll.

A more specific object of the invention is to rotatably mount a roll, of the aforementioned tubular type, in a manner such that a pair of standard bolts having non-circular heads are provided as the sole support for the roll, this object being accomplished by inserting the heads of the bolts into complimentary-shaped openings provided in the inner races of a pair of bearings pressed into the opposite ends of the roll.

A further object of the invention is to provide a roll mounting which permits the roll to be installed by one person, this object being accomplished by mounting the roll to sidewalls using standard bolts in the manner described above and by providing keyhole-shaped holes in the sidewalls, the mounting of the roll then being accomplished by inserting the head of one of the bolts into one of the bearings, by screwing a nut onto the stem of the bolt and then by lifting and canting the roll to insert the nut through the larger upper portion of the key-hole shaped hole and then by permitting the stem of the bolt to drop into the smaller lower portion of the hole while lifting the roll into alignment with the hole in the opposite sidewall whereupon the other bolt is inserted through the latter-mentioned hole and then into the other bearing.

These and other objects will become apparent from a reading of the ensuing description together with the appended drawing.

BRIEF DESCRIPTION OF THE DRAWING

The sole figure is a partially exploded perspective view of an end portion of a spreader roll constructed in accordance with the principles of the present invention and showing the manner of rotatably mounting the roll.

DESCRIPTION OF THE PREFERRED EMBODIMENT

Referring now to the drawing, there is shown an end section of a bale wrap material spreader roll 10 including a smooth tube 12 having spiral flighting 14 thereon for engaging wrap material and augering it toward the outer end of tube, it being noted that similar but oppositely wound flighting is positioned on the opposite end portion of the tube for augering the wrap material towards the opposite end of the tube. In this way the wrap material is spread across the length of the roll 10 by the action of the flighting.

The flighting 14 comprises a spirally wound wire, preferably but not necessarily of circular cross-section, which is wound, when free of the tube 12, to a diameter slightly less than that of the outside diameter of the tube so that the wire will tightly engage the periphery of the tube when mounted thereon, such mounting being accomplished by fixturing the spirally wound wire in a manner permitting it to be forcibly "unwound" so as to increase its internal diameter to permit the insertion of the tube thereinto. The tube 12 is provided with an aperture 16 spaced lengthwise from the end of the tube and, in addition to being spirally wound, the wire is formed so as to have a radially inwardly projecting end 18 that is received in the aperture 16.

Rotation of the spreader roll 10 is caused by its frictional engagement with wrap material as the latter is pulled from a supply roll by driven feed rolls or by a bale being rotated in the bale-forming chamber. The spreader roll 10 extends between opposite support walls 20 (only one shown) and is rotatably supported thereby through identical means including a roller bearing 22 having its outer race pressed into an annular recess 24 provided inside the end of the tube 12 and having a hexagonal bore 26 provided through its inner race. The mounting of each end is completed by a flange head bolt 28 having a hexagonal head 30 tightly received in the bore 26 of the inner race of the bearing 22, with a threaded stem of the bolt extending outwardly through a smaller lower portion 31 of a keyhole-shaped opening 32, having a larger portion 33 located vertically above the portion 31, provided in the support wall 18 and with a nut 34 being received on the stem.

Thus, it will be appreciated that the flange head bolts 28 provide an effective and inexpensive way of rotatably supporting the spreader roll 10 from the support walls 20. While these bolts have been described as having a hexagonal head, any standard, non-circular head, for example a square head will also work if mated with a bearing having an inner race opening shaped complimentary thereto.

The mounting of the roll 10 to the support walls 20 is facilitated by the key-hole shaped openings 32 which permit one of the bolts 28 to be installed in one of the bearings 22 with one of the nuts 34 loosely screwed onto the end of the bolt prior to the roll being lifted, the roll then being placed between the support walls 20 and canted for obtaining clearance and then manipulated for inserting the nut out through the larger upper portion 33 of the key-hole shaped opening 32. This bolt 28 is then permitted to lower with its stem then being disposed in the smaller key-hole opening portion 31 and the roll 10 is then moved so as to permit the other bolt to be inserted through the larger upper portion of the key-hole opening in the other of the walls 20 and installed in the other of the bearings, the roll then being lowered to place the bolt stem in the lower key-hole opening portion. The other nut can then be installed on this bolt and both nuts tightened to secure the roll in place.

It should be noted that, while the description contained hereinabove speaks of the invention as being applied to the mounting of a spreader roll, the invention can be applied to the mounting of other types of rolls without departing from the principles thereof.

What is claimed is:

1. In a combination of a roll assembly and structure for rotatably supporting the same, wherein the roll assembly includes a cylindrical tubular roll and said structure for rotatably supporting including a bearing pressed into each end of the roll and having an inner race provided with a non-circular opening therethrough and receiving a complimentary shaped member which is secured to an adjacent support, the improvement comprising: said member being a bolt having a non-circular head received entirely within the non-circular opening of the bearing and having a threaded stem extending through the support and having a nut received thereon.

2. In a combination of a roll assembly and structure for rotatably supporting the same as defined in claim 1 wherein the non-circular opening in the bearing is hexagonal and wherein the bolt has a hexagonal head.

3. In a combination of a roll assembly and structure for rotatably supporting the same as defined in claim 1 wherein the support is in the form of a sidewall; and said sidewall being provided with a keyhole-shaped opening oriented with a larger portion above a smaller portion thereof, whereby, in the mounting of at least one end of the roll to the sidewall, the bolt may be first pressed into the bearing in the end of the roll, the nut screwed loosely onto the stem of the bolt, the roll then lifted and manipulated to insert the nut through the larger portion of the keyhole-shaped opening and to lower the stem into the smaller portion of the keyhole-shaped opening and the nut tightened to hold the roll in place.

4. In a combination including a roll assembly and structure for rotatably supporting the same as defined in claim 3 wherein the opening in the bearing is hexagonal and the bolt is a bolt having a hexagonal flange head.

5. In a combination including a roll assembly and a structure for rotatably mounting the same wherein the roll assembly includes a cylindrical member and said structure includes a roller bearing pressed into the opposite ends of the member and including an inner race having a non-circular hole extending therethrough, the improvement comprising: a bolt of a type having a head shaped complimentary to and received entirely within said hole of each bearing; said bolt having a threaded stem projecting away from an adjacent bearing; a support wall being located adjacent the opposite ends of the roll and provided with an opening receiving the stem of an adjacent bolt; and a nut being received on each stem.

6. A combination including a roll assembly and structure for rotatably mounting the same as defined in claim 5 wherein said hole of each bearing is hexagonal.

7. A combination including a roll assembly and structure for mounting the same as defined in claim 6 wherein said bolt has a flange head and said nut is a flange nut.

8. A combination including a roll assembly and structure for mounting the same as defined in claim 5 wherein the opening in the wall is keyhole-shaped with a smaller portion of the opening being located below a larger portion thereof, whereby, in mounting the roll to the walls, one of the bolts with one of the nuts loosely screwed thereonto may be installed with its head in one of the bearings and the roll lifted between the walls and canted to insert the installed nut through the larger portion of one of the openings in one of the walls, the stem of the one bolt being lowered into place in the smaller portion of the opening while positioning the roll to permit the other bolt to be inserted through the upper portion of the other key-hole opening in the other wall, and into the bearing at the other end of the roll, the other nut then being screwed onto the stem of this bolt and both nuts tightened to hold the roll in place.

9. A combination including a roll assembly and structure for mounting the same as defined in claim 8 wherein the hole provided in each bearing is hexagonal and each bolt has a hexagonal head received in a respective hole.

10. A combination including a roll assembly and structure for mounting the same as defined in claim 9 wherein each bolt has a flange head and each nut is a flange nut.

* * * * *